United States Patent [19]
Greene

[11] 3,874,174
[45] Apr. 1, 1975

[54] GEOTHERMAL HEAT EXCHANGE METHOD AND APPARATUS

[76] Inventor: Clarence Kirk Greene, 100 N. Arlington Ave., Reno, Nev. 89501

[22] Filed: May 6, 1974

[21] Appl. No.: 466,870

[52] U.S. Cl. .................................. 60/641, 165/45
[51] Int. Cl. ....................... F01k 27/00, F03g 7/00
[58] Field of Search ....................... 60/641; 165/45

[56] References Cited
UNITED STATES PATENTS

| | | | |
|---|---|---|---|
| 3,274,769 | 9/1966 | Reynolds | 165/45 X |
| 3,470,943 | 10/1969 | Van Huisen | 60/641 X |
| 3,827,243 | 8/1974 | Paull | 60/641 |

Primary Examiner—Martin P. Schwadron
Assistant Examiner—Allen M. Ostrager
Attorney, Agent, or Firm—Herbert C. Schulze

[57] ABSTRACT

This is a method and apparatus for utilizing hot brine existing beneath the Earth's surface as a source of power, wherein the hot brine is utilized to volatilize a liquid substance in order to provide a gaseous flow under pressure for the creation of power. The method and apparatus is characterized by the utilization of hot brine from beneath the Earth's surface in contact with an enclosed conduit into which a liquid is placed, which liquid volatilizes and expands in contact with sufficient heat, and in which a unique driver system is utilized to eliminate scale frequently occurring from an operation of this type arrangement.

8 Claims, 2 Drawing Figures

PATENTED APR 1 1975  3,874,174

GEOTHERMAL HEAT EXCHANGE METHOD AND APPARATUS

CROSS REFERENCE TO RELATED PATENT APPLICATIONS

There are no patent applications filed by me which are related to this application.

BACKGROUND OF THE INVENTION

1. Field of the Invention

This invention is in the general field of heat exchange, and more particularly in the field of heat exchange wherein hot brines within the Earth are utilized to create power at the Earths surface.

This invention is more particularly in the field of such method and apparatus wherein the hot brine is utilized to vaporize another liquid in a closed circuit and to utilize this liquid to drive a turbine or otherwise create a source of energy.

2. Description of the Prior Art

It is known that there are pools of hot brine and the like beneath the Earths surface. Generally these pools are at considerable depth, and it has heretofore been known to pump such hot brines to the surface and utilize them for running turbines or other such devices in order to create power on the surface. After initial extraction of power from the hot brine, it is customary to return the same to the brine pool through appropriate conduit or the like.

In my invention, I utilize the hot brine in conjunction with an impervious casing into which a liquid to be vaporized is inserted so as to create vapor under pressure which rises and delivers the energy desired. I further use a driver system to eliminate scaling, and I utilize a further and similar device to recover residual energy from the brine being returned to the depths of the brine pool. There is no art anticipating such arrangement.

SUMMARY OF THE INVENTION

It has been known to those in the art for many years, that there are vast pools of extremely hot brine at various locations beneath the Earths surface. In general these pools are deep beneath the surface and have been difficult to utilize for the production of energy on the Earths surface.

In recent years, however, advances have been made, and the most promising advance seemed to be the method of utilizing such hot brines by drilling pairs of deep wells, and pumping the hot brine from one well, utilizing it to attempt to turn a turbine or the like, and returning it to the basic brine pool through the second well of the pair. Such systems have worked to one degree or another of success, but have been beset with many problems. Among the chief problems is the highly corrosive condition of the brine and its effect upon the equipment which is used, as well as a tendency of the brine to cake upon the well casings and other parts, particularly in pipes above the surface, in such manner as to inhibit the effective use of the heat stored within the brine. These problems, have in fact, made most such operations uneconomical.

I have given a good deal of attention to this problem and have devised a new and unique method together with an apparatus for practicing such method, by which the heat of the brine can be utilized economically and without the deleterious effects upon the equipment. Additionally, as a part of my method, I am able to incorporate a means for removing the scale and the like which has a tendency to accumulate within the well casings.

I have accomplished this by inserting within the hot brine wells a closed casing which casing is enclosed both at the top and the bottom and is impervious, and has a conduit leading out of the well adjacent its upper end. Within this casing, I have inserted a smaller pipe extending to the bottom of the inner casing which is perforated appropriately at various places over its length. This inner pipe may carry water, or any other liquid desired. If it is carrying water, the water may be absolutely pure and thus not have substances which will be corrosive to the equipment, and there will be no scaling.

In my system, I continue to pump hot brine from one well and down through the other well. However, each well utilizes the heat of the hot brine in heating thoroughly the interior casing. The pipe within the interior casing discharges water which is vaporized by this heat and travels up within the confined interior casing wherein still retained in confinement, it goes into a turbine or the like to create power. After the steam vapor has been utilized for the creation of power, it condenses, as is known to those skilled in the art, and it now returns and becomes the water returning within the pipe inside of the center casing. Thus, there is a constant recirculation of the water wherein it condenses into water is dropped into the interior casing, is vaporized by the heat of the brine around the interior casing, returns to the equipment being operated, and once again is condensed to continue the cycle.

Each well is equipped with a like arrangement, and thus, the heat in the returning brine, which has not been used totally in the first well, is further utilized for a second and identical operation.

The second operation is, in some respects, a more efficient operation, since the maximum heat in the second operation is at the top of the well and it will be clear to those skilled in the art that for an operation of this type, wherein steam is being generated in an interior casing, it is desirable that the highest heat be adjacent the outlet of the steam generating unit.

I solved the problem of scaling within the main well casing and about the interior casing in an unusual and effective manner. At the top of the casing I have mounted a plate, which plate has mounted thereon a driver, being a driver of the nature of a loud speaker driver or the like, the construction of which will be known to those skilled in the art. This driver will be of large size, and will be creating a frequency which can be adjusted, on the upper plate to which it is attached. Thus the entire unit is exposed constantly, or at intervals as may be desired, to appropriate sonic vibrations in order to loosen and remove scale which would otherwise form.

With this operation, a most effective and clean continuing heat exchange is accomplished with the extraction of large amounts of power and with no customary corrosive problems with the equipment.

It is an object of this invention to provide a method and apparatus for effectively utilizing the heat of hot brine pools beneath the Earths surface;

Another object of this invention is to provide a method and apparatus for utilizing the heat of the hot brine pools beneath the Earths surface wherein the hot brine is utilized to vaporize another liquid;

3

Another object of this invention is to provide a method and apparatus for utilizing hot brine from hot brine pools beneath the Earths surface for the generation of energy, wherein the problems of corrosion and scaling are eliminated.

The foregoing and other objects and advantages will be clear to those skilled in the art upon reading the following description of a preferred embodiment in conjunction with the appended drawings.

DESCRIPTION OF A PREFERRED EMBODIMENT

Figure 1:
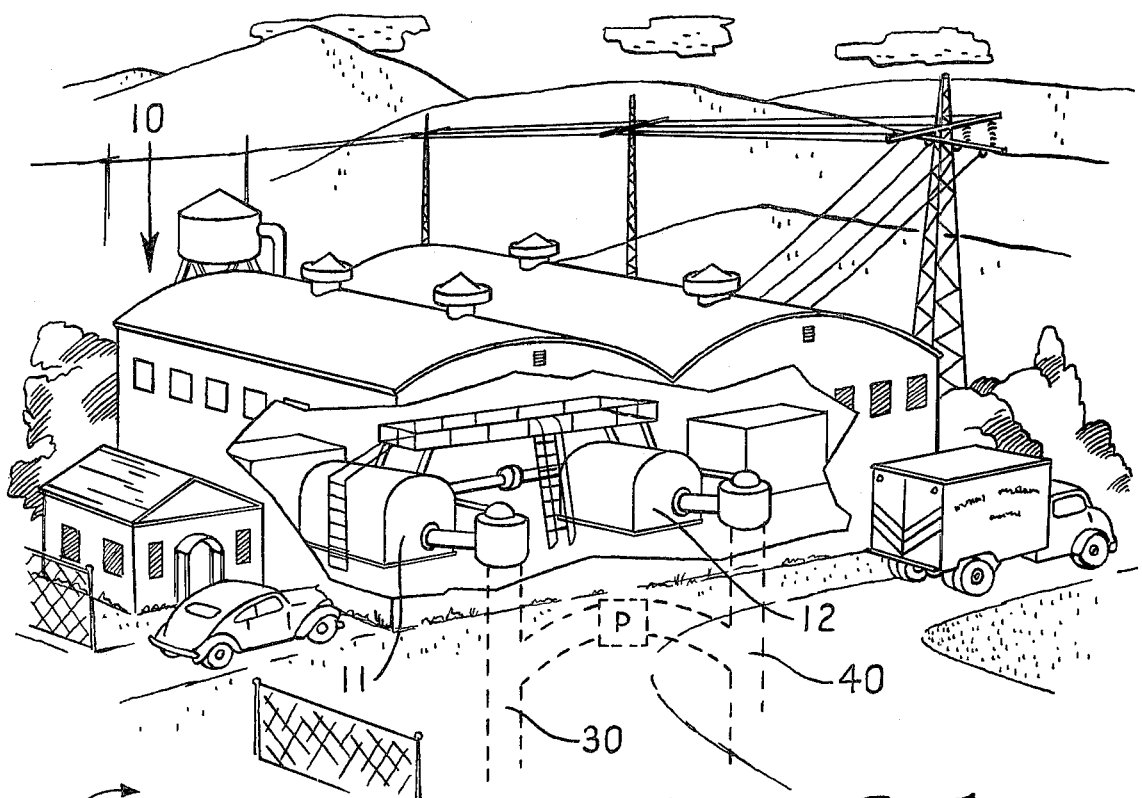
FIG. 1 is a perspective of a power plant utilizing the method and apparatus of this invention.
Figure 2:
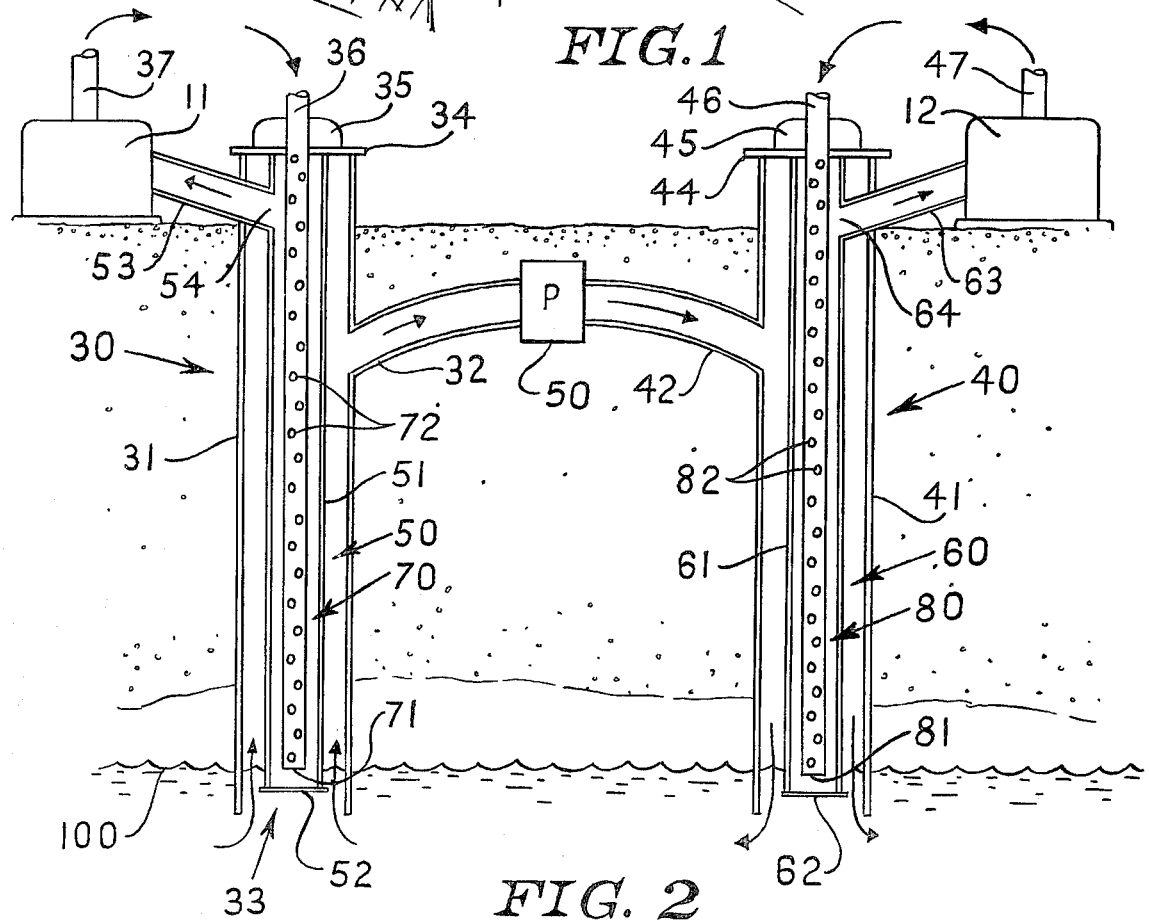
FIG. 2 is a partially sectioned schematic view of the flow of brine and other materials utilized to practice the method of this invention.

A preferred embodiment of an apparatus for practicing the method of this invention is shown graphically in FIGS. 1 and 2.

FIG. 1 is a general representation of a power producing plant 10 having a pair of turbine generators 11 and 12 or the like, and utilizing hot brine wells 30 and 40.

FIG. 2 illustrates, diagramatically, the elements of this invention.

In FIG. 2, the well 30 is shown to consist of an outer casing 31 terminating in an open-ended lower portion in a sub-surface hot brine 100. At the upper end of casing 31 there is a plate 34 completely enclosing the top, and plate 34 has a suitable driver or vibrator 35, having a hole in its center, through which passes fluid pipe 36. This pipe will be welded, or otherwise sealed, so that the hot brine casing 31 is effectively sealed at its top. The hot brine casing 31 has an opening to which a pipe 32 is welded or otherwise solidly connected without leakage approximately as indicated, and has another opening through which pipe 53 passes adjacent its upper end, and pipe 53 is again sealed by welding or the like about said pipe 53. Pipe 53 interconnects with and is solidly and imperviously connected to an inner casing 51 forming the main elongated heat exchange chamber. Casing 51 is sealed at its lower end at approximately the brine level by a plate or the like 52 appropriately welded or otherwise fixed imperviously to the lower end of the casing 51. Casing 51 is likewise welded or otherwise imperviously sealed at its upper end to plate 34.

It will be noted that a chamber 50 is provided between casing 31 and casing 51 which chamber 50 surrounding casing 51 becomes the passageway for hot brine passing upward through the chamber 50 in the direction of the arrows indicating such passage. The general area 33 indicates the general intake area of the brine between casings 31 and 51.

The pipe 36 extending within the casing 51 is normally closed at its end 71, although some opening may be left there if desired. The pipe 36 will be provided with a plurality of perforations 72 at desired intervals on its length, generally most of the openings will be in the lower portion thereof. Pure water or the like will flow through the pipe 36 and out through the opening 72 into the chamber 70 where it will be heated, generally to the point of vaporization, by the effect of the hot brine about the exterior casing 51. The heated vapor will pass in the direction of the arrow within the pipe 53 to a turbine or the like 11 where it will generate power. As it is expended and utilized in the turbine it will normally condense into liquid and will flow through pipe 37 back to pipe 36. No connection has been shown between these pipes, but connections of various types are known to those skilled in the art and need not be explained. It is also possible that a pumping arrangement may be utilized here for the purpose of moving the condensed water back from pipe 37 to pipe 36.

The hot brine 100 will be caused to flow upward in casing 31 by means of a pump or the like 50 and from this casing it will be moved back to well 40 and will flow down within casing 41. It will be noted that the structure of the well 40 is essentially the same as the well 30 wherein the hot brine returns through pipe 42 imperviously connected to casing 41 and flows downward through chamber 60 between casing 41 and innercasing 61. The innercasing 61 is sealed at its lower end by plate 62, and both of these casings are sealed at plate 44 as indicated. A fluid return pipe 46 having perforations 82 and a lower end 81 sealed as desired extends through the driver 45 and is imperviously connected to the plate 44. Perforations 82 are provided for the release of fluid flowing through 46 into the heat exchange chamber 80 wherein it will be vaporized in the same manner as in the unit 30 as previously described. The vaporized material will flow in the direction of the arrow through pipe 63 which is imperviously connected around casing 41. The vapor enters turbine generator unit 12 and after condensation returns through connections between pipes 47 and 46 in a similar manner to that of the well 30.

It will be noted that the position of the pump 50 might be at some other location within well 30, as for instance, on the surface of the earth, and numeroud other arrangements may be utilized for passing the brine up in this manner. It will also be noted that the drivers 35 and 45 may be sonic type elements to provide sonic waves or could be of other vibratory nature so as to provide a constant sonic cleaning effect to the interior casings and other elements. It will be particularly noted that with the closed end 52 and 62 on the casing 51 and 61 that an excellent sounding arrangement is provided for the propagation and utilization of the sound waves being generated for cleaning.

It should be especially noted that this system is unique as compared to other systems for utilizing hot brine in that the heat exchange now takes place within the well casing and underground, where maximum efficiency and maintenance of heat within the heat exchange unit is accomplished. This extremely large surface for heat exchange is unusual and can result in great generation of vapor under controlled conditions.

The same situation exists in both wells, except, that as is known in the art, it is more effective to have the highest heat of the heat exchange unit near the actual vapor discharge. In this case, this has been accomplished, in a manner which has not previously been possible with the hot brine exchange units.

The fluid being utilized for vaporization, as previously indicated, may be water or any other suitable fluid, but in general iso-butane will be considered extremely desirable because of its low boiling point and will thus extract more of the heat and utilization thereof from the hot brine.

While the embodiment of this invention specifically described and illustrated is fully capable of achieving the object and advantages desired, it is to be understood that the particular embodiment shown has been for purposes of illustration only, and not for purposes of limitation.

I claim:

1. The method of generating power including: establishing two deep wells adjacent each other into a pool of hot brine beneath the earths surface; enclosing an heat exchange apparatus within each of said wells; circulating hot brine upward within one of said wells and thence downward within the other of said wells; causing vapor to be created within each of said heat exchange units by reason of heat from said hot brine; causing the said vapor so generated to be utilized to produce power by appropriate power generating means; condensing said vapor during and after said power generation; and returning said condensed vapor to said heat exchange unit.

2. The method of claim 1 in which sonic energy is directed into each of said wells so as to constantly agitate the interior thereof so as to dispel any scale which may tend to form on either the interior of the well casing or the heat exchange apparatus.

3. The method of claim 2 in which said sonic energy is generated by a sonic generator affixed to the upper extremity of the well casings.

4. An apparatus for obtaining energy from hot brine beneath the surface of the earth comprising: two wells adjacent one another having casings therein open at their lower extremities and in which the lower extremities extend into hot brine; means connecting said two wells so as to permit flow of water adjacent their upper extremities from one to the other; pump means associated with at least one of said wells so as to pump the brine through the casing and up in the well and so as to move it through the interconnecting means to the other well in such manner that it may flow down into the earth; heat exchange apparatus extending substantially the full length of each of said wells and within each of said wells so as to be contacted by hot brine flowing through said wells; means associated with said heat exchange means to vaporize a liquid by reason of said heat exchange; means to transport said vapor to energy producing means operated by vapor; means to condense said vapor during the production of energy or thereafter; means to transport said condensed material to said heat exchanger; and means to utilize or store the energy produced by said energy producing means.

5. The apparatus of claim 4 in which sonic energy producing means are associated with each of said wells so as to introduce sonic energy into each of said wells in said manner as to inhibit the formation of scale upon the interior of the well casings and upon the heat exchange means.

6. The apparatus of claim 5 in which each of said heat exchange means comprises an elongated chamber within at lease one of said pair of wells, which chamber is wholly sealed from passage of brine into its interior from said well.

7. The device of claim 6 in which each of said chambers contains means to carry a liquid essentially the length of such chamber and release said liquid into said chamber.

8. The device of claim 7 in which said chamber has a conduit extending therefrom interconnected with an energy producing device utilizing vapor and in which each of said fluid carrying means is connected to such energy producing means in such manner as to reconvey condensed vapor into said chamber.

* * * * *